US012544789B2

(12) United States Patent
Kainulainen et al.

(10) Patent No.: US 12,544,789 B2
(45) Date of Patent: Feb. 10, 2026

(54) VIBRATING SCREEN FOR SCREENING AGGREGATES AND/OR SOILS

(71) Applicant: ALLU Innovation and Research Center Oy, Pennala (FI)

(72) Inventors: Hannu Kainulainen, Pennala (FI); Markku Jonninen, Lohilahti (FI)

(73) Assignee: ALLU Innovation and Research Center Oy, Pennala (FI)

(*) Notice: Subject to any disclaimer, the term of this patent is extended or adjusted under 35 U.S.C. 154(b) by 0 days.

(21) Appl. No.: 18/856,761

(22) PCT Filed: Apr. 17, 2023

(86) PCT No.: PCT/FI2023/050213

§ 371 (c)(1),
(2) Date: Oct. 14, 2024

(87) PCT Pub. No.: WO2023/214112

PCT Pub. Date: Nov. 9, 2023

(65) Prior Publication Data

US 2025/0249482 A1 Aug. 7, 2025

(30) Foreign Application Priority Data

May 4, 2022 (FI) ..................................... 20225384

(51) Int. Cl.
*B07B 1/28* (2006.01)
*B07B 1/12* (2006.01)
(Continued)

(52) U.S. Cl.
CPC ................ *B07B 1/286* (2013.01); *B07B 1/12* (2013.01); *E02F 3/407* (2013.01); *E02F 7/06* (2013.01); *B07B 2201/04* (2013.01)

(58) Field of Classification Search
CPC .......... B07B 1/286; B07B 1/12; B07B 1/4609
(Continued)

(56) References Cited

U.S. PATENT DOCUMENTS

| | | | | |
|---|---|---|---|---|
| 6,375,012 | B1 | 4/2002 | Leyland | |
| 6,401,937 | B1 * | 6/2002 | Schmidt ................ | D21B 1/028 209/660 |

(Continued)

FOREIGN PATENT DOCUMENTS

| | | | |
|---|---|---|---|
| CN | 2502803 | Y | 7/2002 |
| CN | 111036547 | A | 4/2020 |

(Continued)

*Primary Examiner* — Molly K Devine

(74) *Attorney, Agent, or Firm* — Sisson & Banyas, Attorneys at Law, LLC; Jeffrey J. Banyas

(57) ABSTRACT

A vibrating screen for screening aggregates and/or soils. The screen includes a body, a chute shaped stationary screening deck, fixed to the body by its opposite ends. The stationary screening deck includes stationary screening flat bars, which form first screening slots between them, which have a curved shape corresponding to the shape of the stationary screening deck. The screen includes a chute shaped vibrating screening deck, which is supported to the body by eccentric shafts. The vibrating screening deck is arranged to be vibrated by machine power by rotating the eccentric shafts synchronously with each other, each point of the screening deck is in revolving motion continuously in the same rotating direction along a circular path when the eccentric shafts rotating. The vibrating screening deck includes vibrating flat bars, which form second screening slots between them and whose curved shape corresponds to the chute shape of the vibrating screening deck.

19 Claims, 6 Drawing Sheets

(51) Int. Cl.

| | |
|---|---|
| ***E02F 3/407*** | (2006.01) |
| ***E02F 7/06*** | (2006.01) |

(58) Field of Classification Search

USPC .................................................. 209/274, 275

See application file for complete search history.

(56) References Cited

U.S. PATENT DOCUMENTS

| | | | | |
|---|---|---|---|---|
| 9,080,315 | B2 * | 7/2015 | Jonninen | B07B 1/54 |
| 10,737,297 | B2 * | 8/2020 | Michalak | B07B 13/003 |
| 2017/0144196 | A1 * | 5/2017 | Schulze Buxloh | B07B 13/003 |

FOREIGN PATENT DOCUMENTS

| | | | |
|---|---|---|---|
| IT | MO20130094 | A1 | 10/2014 |
| JP | 2021092040 | A | 6/2021 |
| WO | 9012929 | A1 | 11/1990 |

* cited by examiner

VIBRATING SCREEN FOR SCREENING AGGREGATES AND/OR SOILS

PRIORITIES AND CROSS REFERENCES

This Application claims priority from International Application No. PCT/FI2023/050213 filed on 17 Apr. 2023 and Finnish Application No. 20225384 filed on 4 May 2022, the teachings of each of which are incorporated by reference herein in its entirety.

The invention relates to a vibrating screen for screening aggregates and/or soils said screen includes a body, a chute shaped stationary screening deck, which is stationarily fixed to the body by its opposite ends, the stationary screening deck including stationary screening flat bars, which form first screening slots between them and whose curved shape corresponds to the shape of the stationary screening deck. The vibrating feature of the screen is provided by a chute shaped vibrating screening deck which is arranged in a connection with a stationary screening deck so that the stationary screening flat bars and the vibrating flat bars of the vibrating screening deck are next to each other and one after the other.

From the publication EP 2778292 B1 is known a screening and crushing device for aggregates and/or soils which having a chute shaped stationary screening deck in which blades fixed to rotating shafts move in screening slots. The shafts are positioned below the screening deck so that only tips of the blades extend above the screening deck. This known screen is not a vibrating screen as the shafts and the blades rotate around their straight axis without a vibrating feature.

From the publication EP 2581140 B1 (FIG. 1) is known a vibrating screen which does not have a stationary screening deck and its vibrating screening deck providing the vibrating feature is planar. Thus, getting material to be screened moving during each vibration impact requires a lot of energy as the entire material has to be lifted up at once.

An object of the invention is to provide an improved vibrating screen, whose energy consumption and required operating power can be substantially reduced while screening efficiency is improved.

The object is achieved with a vibrating screen according to the invention, which includes a chute shaped vibrating screening deck, which is supported to the body by eccentric shafts and is arranged to be vibrated by machine power by rotating the eccentric shafts synchronously with each other, thereby each point of the screening deck is in revolving motion continuously in the same rotating direction along a circular path when the eccentric shafts rotating. The vibrating screening deck includes vibrating flat bars, which form second screening slots between them, and whose curved shape corresponds to the chute shape of the vibrating screening deck. The vibrating flat bars are located between the first screening slots, and the screening decks are positioned at such a height level in relative to each other that during one cycle the vibrating flat bars rise partly above a screening surface formed by upper edges of the stationary screening flat bars at different sections of the stationary screening deck one after another and at different times.

This differs from the vibrating screen known from the publication EP 2581140 B1 mainly so that in the invention is used also a stationary screening deck, in which the vibrating flat bars move in the screening slots, and that both screening decks are cutter shaped. Thus, the stationary screening deck temporarily and locally partially supports the material to be screened, and the vibrating screen deck lifts different parts of the material to screened at different times, which reduces the energy consumption and the required starting torque and provides rotation of the material on the screening deck, which increases the screening efficiency.

An exemplary embodiment of the invention will now be described more closely with reference to the accompanying drawings, in which.

The vibrating screen includes a body 1 which comprises plate walls and fixing structures of screening decks 6 and 7 defining a screening space. A chute shaped stationary screening deck 6 is fixed to the body 1 by its opposite ends. The stationary screening deck 6 may be formed of three adjacent elements according to FIG. 4. The stationary screening deck 6 includes stationary screening flat bars 8, which create first screening slots 8*a* between them. A curved shape of the screening flat bars 8 corresponds to the shape of the chute of stationary screening deck 6.

Figure 1:
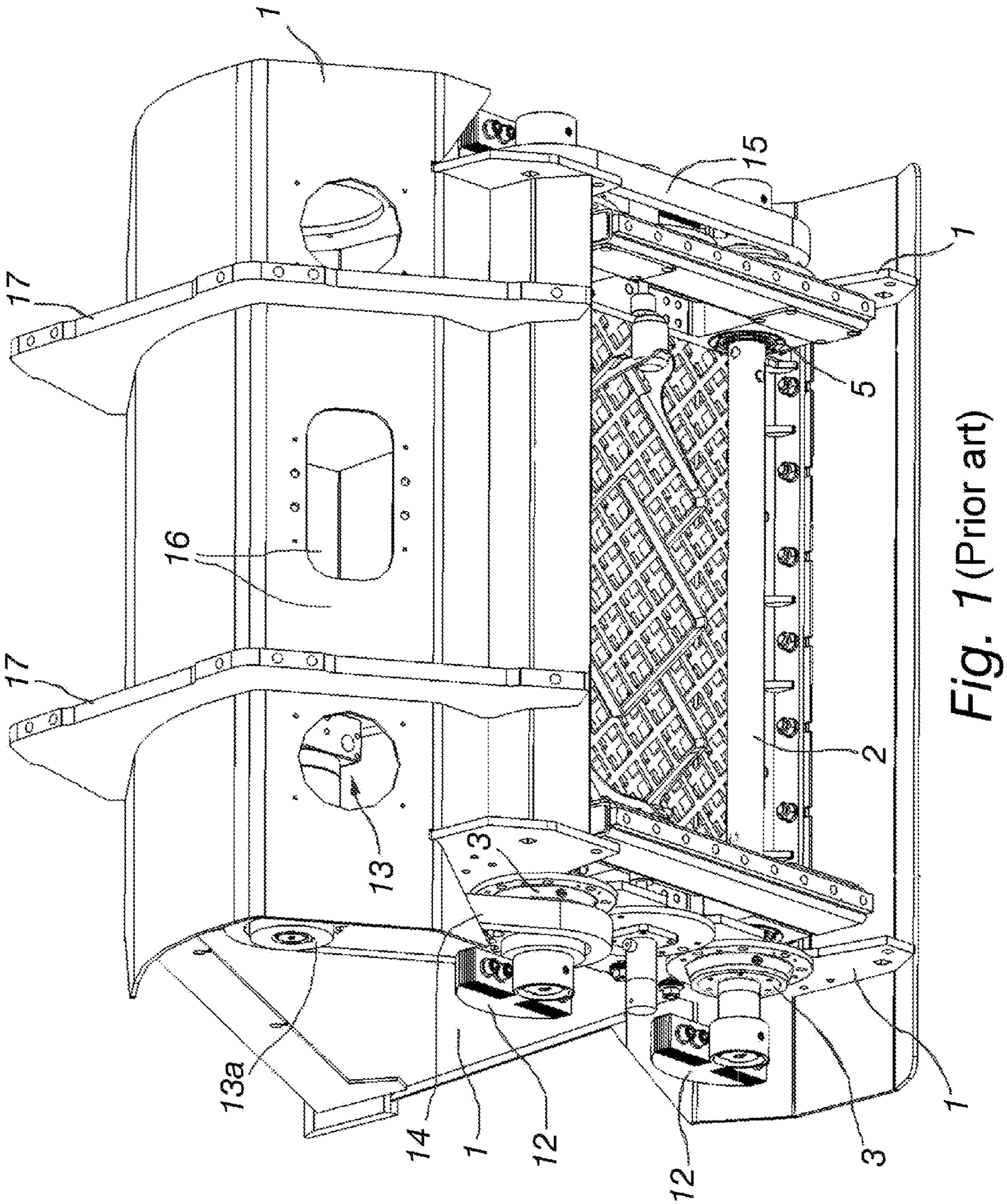
Fig. 1 (Prior art)
FIG. 1 shows a vibrating screen known from the publication EP 2581140 B1 according to the prior art as seen from below and a partly cutaway views of ends.
Figure 2:
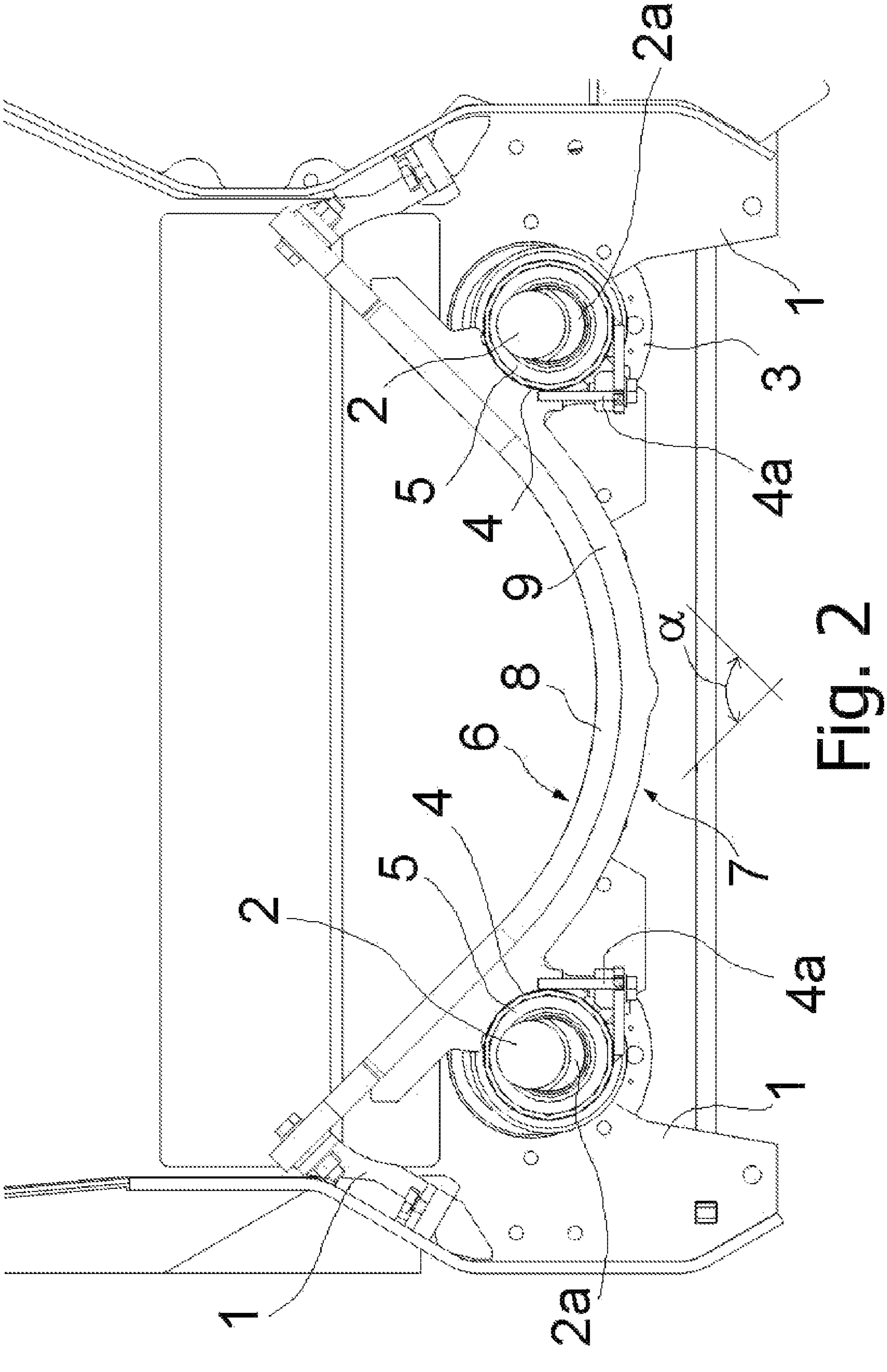
FIG. 2 shows the vibrating screen according to the invention as seen from an end, the end being cutaway view and parts being removed from the ends of the eccentric shafts 2.
Figure 5:
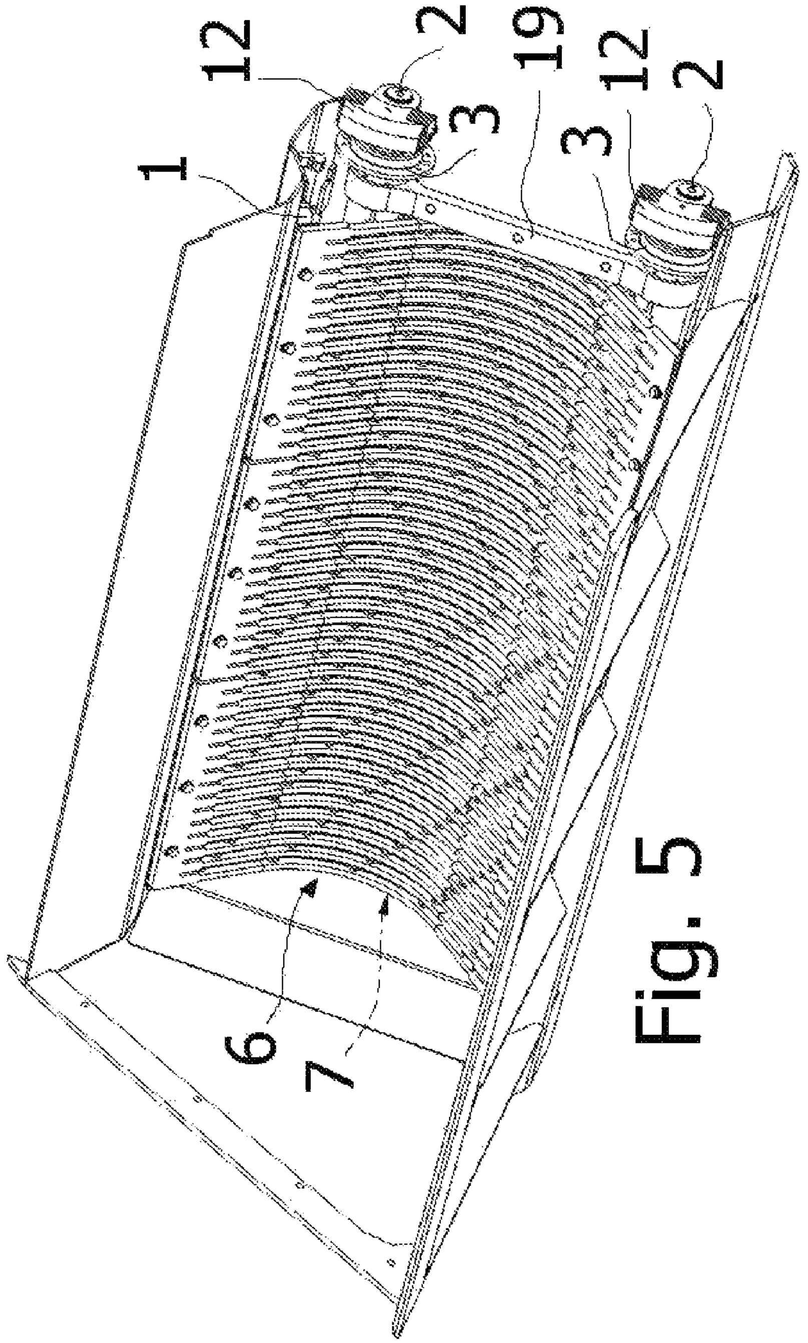
FIG. 5 shows axonometrically a vibrating screen according to the invention as seen from top so that one end is a cutaway view.
Figure 6:
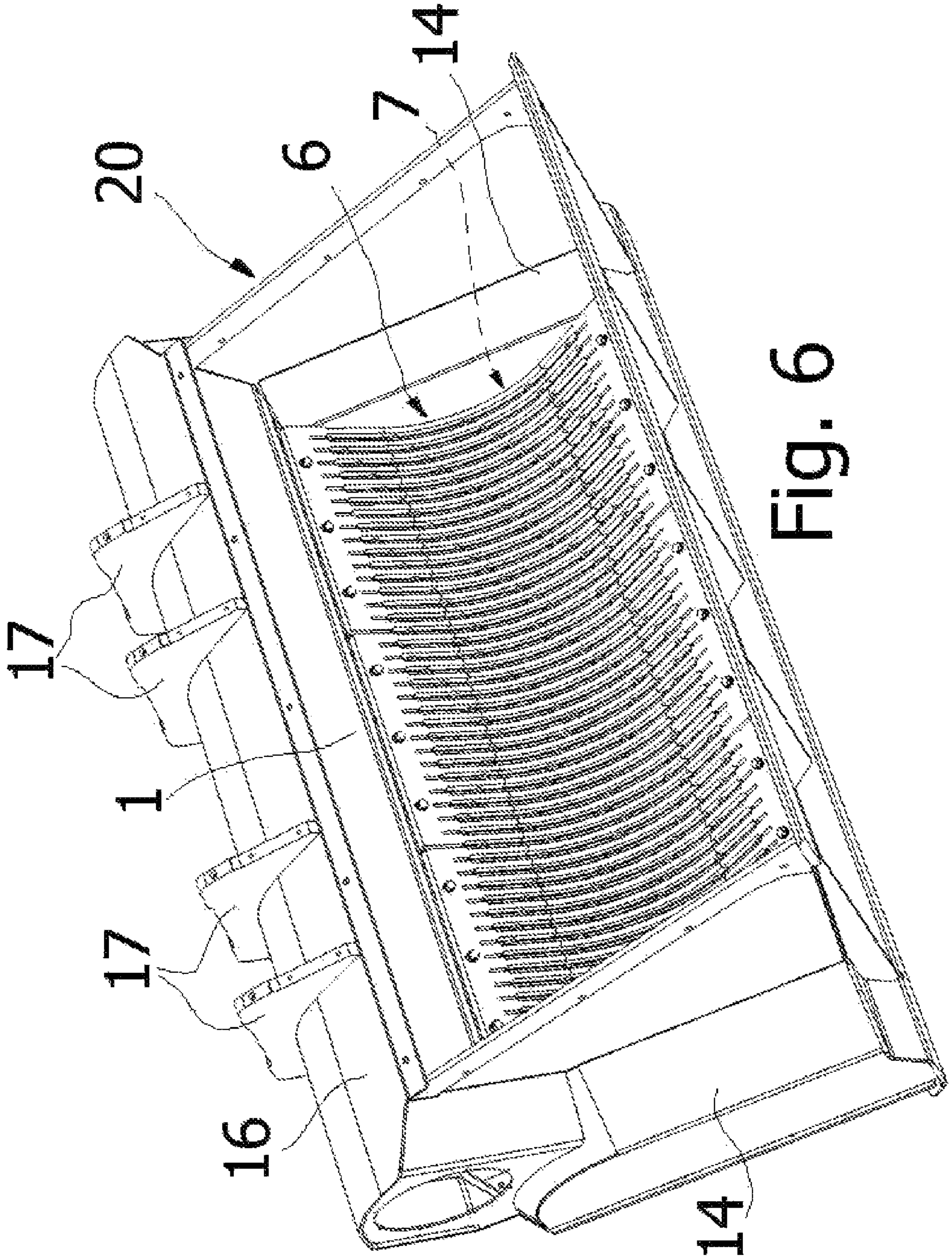
FIG. 6 shows axonometrically a vibrating screen according to the invention arranged to a bucket movable by heavy machine as seen from top.

The vibrating screening deck 7 includes vibrating flat bars 9, which create second screening slots 7*a* between them and whose curved shape corresponds to the chute shape of the vibrating screening deck 7. The vibrating screening deck 7 is supported to the body 1 by eccentric shafts 2. Both eccentric shafts 2 include an end part and a throw shaft 2*a* between them, whose central axis is at short radial distance from a rotation axis of the end parts. Thus, the throw shaft 2*a* rotates eccentrically to the central axis of end parts of the eccentric shaft 2. The eccentric shafts 2 are bearing-mounted rotatable by body bearings 3 which surround the end parts are fixed to the body 1. The body bearings 3 are shown in FIG. 5 and fixing flanges of the body bearings 3 are shown partly in FIG. 2 at opposite ends of the shafts 2. Corresponding body bearings 3 can also be seen in FIG. 1, which shows a rotating motor 13 of the eccentric shafts 2 in a housing 16 and a chain or a toothed belt 14, with which the rotating drive is transmitted to the eccentric shafts 2. FIG. 1 also shows a chain or a belt 15 connecting the opposite ends of eccentric shafts 2, with which the rotation drive is transferred to another of the eccentric shafts 2, thereby the eccentric shafts 2 rotate synchronously with each other. In the present invention may be used a similar driving force arrangement, whose motor is in the housing 16 of the vibrating screen bucket 20 shown in FIG. 6 and the power transmission is in the housings 14.

The throw shafts 2*a* are supported by bearings 5 inside the body tubes 4 of the vibrating screening deck 7. The vibrating flat bars 9 are fixed to the body tubes 4 with fixing means 4*a*. Thus, the vibrating screening deck 7 formed by the vibrating flat bars 9 may be vibrated by machine power by rotating the eccentric shafts 2 synchronously with each other, thereby as the eccentric shafts 2 rotate, each point of the vibrating screening deck 7 is in circular motion continuously in the same direction of rotation along a circular path, the radius of which corresponds to the eccentricity between the end parts of the eccentric shaft 2 and the throw shaft 2*a*. This eccentricity between the body bearing 3 and the bearing 5 of the throw shaft 2*a* is typically 15-25 mm, for example in the embodiment of FIG. 6, where the screening decks 6, 7 form the vibrating screening deck of the bucket 20 of the heavy machine and the body 1 of the screen is stationary connected to the bucket 20. The vibrating screen bucket 20 may be connected to a boom of the heavy machine with lugs 17.

The rotational speed of the eccentric shafts 2 may be, for example, in the range of 700-1200 rpm, thus the vibration frequency exceeds the characteristic vibrational frequency of the structure of the vibrating screen according to the embodiment. A high rotation speed, i.e. a high vibration frequency, achieves a good screening capacity. With small values of eccentricity, the rotation speed can be in the range of 1200-1500 rpm, because it achieves a sufficient peripheral speed in the said circular path, i.e. a sufficient surface speed of the vibrating screening deck 7 to achieve sufficiently fast circular motion of the material. The rotation speed can also be below the characteristic vibration frequency of the screen, for example 400-500 rpm.

When the eccentric shafts 2 rotate, the entire rotating mass causes a rotational force in the radial direction of the shafts 2, which is balanced by the counterweights 12 attached to the ends of the shafts 2. The distance of the centre of a mass of the counterweights 12 from the axis of rotation of the body bearings 3 is multiple, e.g. 10 times compared to the eccentricity of the eccentric shafts 2, thereby a counter-weight is needed one tenth of the mass of the screening structure movable with the eccentric shafts 2.

Figure 3:
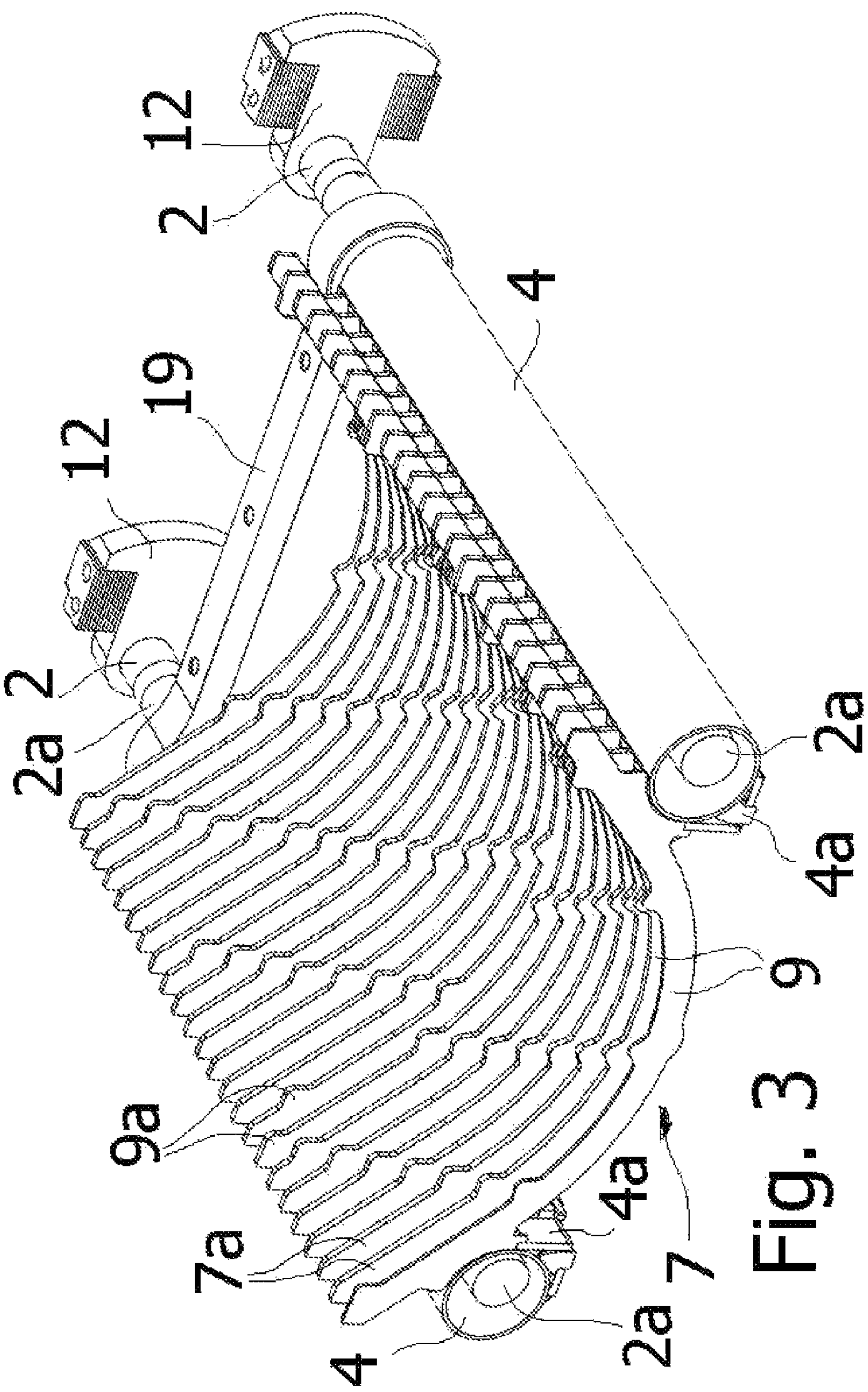
FIG. 3 shows axonometrically a cross section of the vibrating screening deck according to the invention.

FIG. 3 shows a connection of the ends of the body tubes 4 to each other with a support rod 19, which stiffens the vibrating screening deck 7.

The vibrating screening deck 7 includes vibrating flat bars 9, which create second screening slots 7*a* between them and whose curved shape corresponds to the shape of the chute of the vibrating screening deck 7. The vibrating flat bars 9 are located in the first screening slots 8*a*. The screening decks 6,7 are positioned at such a height level in relative to each other that during one cycle of the eccentric axis 2 the vibrating flat bars 9 rise partly above a screening surface formed by upper edges of the stationary screening flat bars 8 at different sections of the stationary screening deck 6 one after another and at different times. Due to the chute shape of the screening decks 6 and 7, the said circular movement of the screening deck 7 causes the vibrating flat bars 9 of the screening deck 7 to sink below the upper surface of the screening flat bars 8 of the screening deck 6 by about half of the cycle, so the entire material to be screened does not have to be lifted in any case. During the circular movement of the screening deck 7, the vibrating flat bars 9 first rise from the front edge of the screen above the upper surface of the stationary screening deck 6 and then in the direction of movement the peak of the rise moves towards the rear edge of the screen. Thus, the entire material to be screened is not lifted at the same time. In addition, due to the curved shape of the screening decks 6 and 7, the mass movements are not only up/down movements, but simultaneous up and down movements to different parts of the mass balance each other's effects. In addition, the power requirement at the start moment decreases and the total mass of the screen decreases when the moving mass of the screen, which is balanced by the counterweights 12, decreases. At the same time, the material to be screened is provided into circulating movement, which increases the screening power.

Preferably, curvatures of stationary screening flat bars 8 and the vibrating flat bars 9 correspond to each other, thereby a chute-like shapes of the stationary screening deck 6 and the vibrating screening deck 7 correspond to each other. There may be small differences in the curvatures of the screening decks 6 and 7, as long as the vibrating flat bars 9 remain in the screening slots 8*a* between the screening flat bars 8. The height of the screening flat bars 8 and vibrating flat bars 9 must therefore be substantially greater than the value of the eccentric shafts 2 multiplied by two, which is the same as the diameter of the circular movement of each point of the vibrating flat bars 9.

In one preferred embodiment of the invention, the stationary screening flat bars 8 and vibrating flat bars 9 are curved only at the central sections of the screening decks 6 and 7. At the end sections of the screening decks 6 and 7, the stationary screening flat bars 8 and vibrating flat bars 9 are straight. The angle $\alpha$ between the end sections of the screening decks 6 and 7 is in the range of 80-120 degrees, preferably 85-100 degrees, typically around 90 degrees.

In one preferred embodiment of the invention, the upper edge of the vibrating flat bars 9 of the vibrating screening deck 7 having local protrusions 9*a*. These local protrusions 9*a* are located offset from each other. The protrusions 9*a* promote the rotation of the material on the screening decks.

Figure 4:
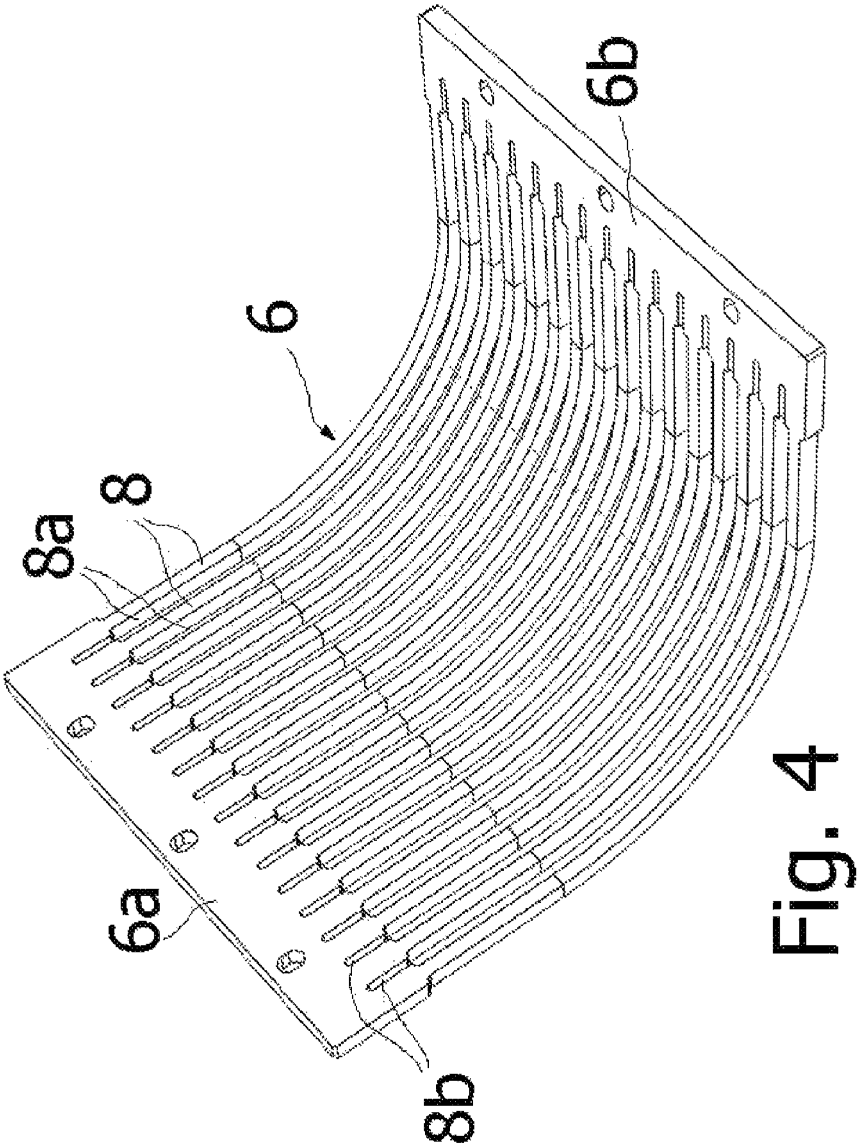
FIG. 4 shows axonometrically an element of the stationary screening deck.

As shown in FIG. 4, guiding slots 8*b*, which are narrower than the screening slots, locate at the ends of the screening slots 8*a* of the stationary screening deck 6, where the ends of the vibrating flat bars 9 of the vibrating screening decks 7 are positioned. Thus, the vibrating flat bars 9 are guided in the middle of the screening slots 8*a*. In addition, the side surfaces of the stationary screening flat bars 8 may have local protrusions that support and guide the vibrating flat bars 9 moving in the screening slots 8*a*.

The gaps between the screening flat bars 8 and the vibrating flat bars 9 determine the size of fraction of the sieved material, which can be influenced by the thickness and distance of the screening flat bars 8 and the vibrating flat bars 9. The elements of the fixed screening deck 6 according to FIG. 4 may be manufactured from the screening flat bars 8 having different thickness, and different screening slots 8*a*. The vibrating flat bars 9 of the vibrating screening deck 7 according to FIG. 3 may be manufactured with different thicknesses and they can be attached to the body tubes 4 of the vibrating screening deck 7 at desired intervals. The size of the fraction to be screened can therefore be easily selected and changed.

The invention claimed is:

1. A vibrating screen for screening aggregates and/or soils, said screen includes a body (1), a chute shaped stationary screening deck (6), which is stationarily fixed to the body (1) by its opposite ends, the chute shaped stationary screening deck including stationary screening flat bars (8), which form multiple first screening slots (8*a*) between them and which have a curved shape corresponding to the chute shaped stationary screening deck (6), characterized in that the screen includes a chute shaped vibrating screening deck (7), which is supported by the body by eccentric shafts (2) and is arranged to be vibrated by machine power by rotating the eccentric shafts (2) synchronously with each other, thereby each point of the chute shaped vibrating screening deck (7) are in revolving motion continuously in a same rotating direction along a circular path when the eccentric shafts (2) rotate, that the chute shaped vibrating screening deck (7) includes vibrating flat bars (9), which create second screening slots (7*a*) between them and whose curved shape corresponds to the chute shaped vibrating screening deck, that the vibrating flat bars (9) are located in first screening slots (8*a*), and that the screening decks (6,7) are positioned at such a height level in relative to each other that during one cycle the vibrating flat bars (9) are risen partly above a screening surface formed by an upper edge of the stationary screening flat bars (8) at different sections of the chute shaped stationary screening deck (6) one after another and at different times.

2. A vibrating screen according to claim 1, characterized in that the stationary screening flat bars (8) and the vibrating flat bars (9) are curved at central sections of the screening decks (6,7) and the stationary screening flat bars (8) and the vibrating flat bars (9) are straight at end sections of the chute shaped stationary screening deck and chute shaped vibrating screening deck.

3. A vibrating screen according to claim 2, characterized in that an angle between end portions of the chute shaped stationary screening deck and chute shaped vibrating screening deck is in a range of 80-120 degrees.

4. A vibrating screen according to a claim 3, characterized in that the angle between the end portions of the chute shaped stationary screening deck and chute shaped vibrating screening deck is in the range of 85-100 degrees.

5. A vibrating screen according to claim 4, characterized in the chute shaped stationary screening deck (6) and chute shaped vibrating screening deck (7) form a base of a movable bucket (20) of a heavy machine and the body (1) of the vibrating screen is fixedly joined to the movable bucket (20).

6. A vibrating screen according to claim 5, characterized in that the upper edge of the vibrating flat bars (9) of the chute shaped vibrating screening deck (7) have local protrusions (9*a*).

7. A vibrating screen according to claim 6, characterized in that the local protrusions (9*a*) of different vibrating flat bars (9) are located offset from each other.

8. A vibrating screen according to claim 1, characterized in that an angle between end portions of the chute shaped stationary screening deck and chute shaped vibrating screening deck is in a range of 80-120 degrees.

9. A vibrating screen according to a claim 8, characterized in that the angle between the end portions of the chute shaped stationary screening deck and chute shaped vibrating screening deck is in the range of 85-100 degrees.

10. A vibrating screen according to claim 9, characterized in that the chute shaped stationary screening deck (6) and chute shaped vibrating screening deck (7) form a base of a movable bucket (20) of a heavy machine and the body (1) of the vibrating screen is fixedly joined to the movable bucket (20).

11. A vibrating screen according to claim 10, characterized in that the upper edge of the vibrating flat bars (9) of the chute shaped vibrating screening deck (7) have local protrusions (9*a*).

12. A vibrating screen according to claim 11, characterized in that the local protrusions (9*a*) of different vibrating flat bars (9) are located offset from each other.

13. A vibrating screen according to claim 1, characterized in that the chute shaped stationary screening deck (6) and chute shaped vibrating screening deck (7) form a base of a movable bucket (20) of a heavy machine and the body (1) of the vibrating screen is fixedly joined to the movable bucket (20).

14. A vibrating screen according to claim 1, characterized in that the upper edge of the vibrating flat bars (9) of the chute shaped vibrating screening deck (7) have local protrusions (9*a*).

15. A vibrating screen according to claim 14, characterized in that the local protrusions (9*a*) of different vibrating flat bars (9) are located offset from each other.

16. A vibrating screen according to claim 1, characterized in that an end of the first screening slots (8*a*) of the chute shaped stationary screening deck (6) having narrower guiding slots (8*b*), in which ends of the vibrating flat bars (9) of the vibrating screening deck (7) are located.

17. A vibrating screen according to claim 1, characterized in that curvatures of stationary screening flat bars (8) and the vibrating flat bars (9) correspond to each other, thereby a chute shape of the chute shaped stationary screening deck (6) and the vibrating screening deck (7) correspond to each other.

18. A vibrating screen according to claim 1, characterized in that end parts of the eccentric shafts (2) are bearing-mounted to the body (1) with body bearings (3), and there are eccentric throw shafts (2*a*) between the end parts of the eccentric shafts (2), which are eccentric to the end parts and bearing-mounted (5) inside body tubes (4) of the vibrating screening deck (7).

19. A vibrating screen according to claim 1, characterized in that an eccentricity of the eccentric shafts (2) is in a range of 15 mm-25 mm, thereby a radius of the circular path of a vibrating movement is in a range of 30-50 mm.

* * * * *